US010102827B2

(12) United States Patent
Putraya et al.

(10) Patent No.: US 10,102,827 B2
(45) Date of Patent: Oct. 16, 2018

(54) METHODS, APPARATUSES AND COMPUTER PROGRAM PRODUCTS FOR GENERATING PANORAMIC IMAGES USING DEPTH MAP DATA

(75) Inventors: Gururaj Gopal Putraya, Bangalore (IN); Pranav Mishra, Bangalore (IN); Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 219 days.

(21) Appl. No.: 14/122,514

(22) PCT Filed: Apr. 5, 2012

(86) PCT No.: PCT/FI2012/050349
§ 371 (c)(1),
(2), (4) Date: Jan. 10, 2014

(87) PCT Pub. No.: WO2012/164148
PCT Pub. Date: Dec. 6, 2012

(65) Prior Publication Data
US 2014/0184640 A1    Jul. 3, 2014

(30) Foreign Application Priority Data

May 31, 2011 (IN) .......................... 1856/CHE/2011

(51) Int. Cl.
*G06T 3/40* (2006.01)
*H04N 5/232* (2006.01)
(Continued)

(52) U.S. Cl.
CPC ........... *G09G 5/377* (2013.01); *G06T 3/4038* (2013.01); *H04N 5/23238* (2013.01); *H04N 2013/0088* (2013.01)

(58) Field of Classification Search
CPC .. G09G 5/377; G06T 3/4038; H04N 5/23238; H04N 2013/0088; H04N 5/232;
(Continued)

(56) References Cited

U.S. PATENT DOCUMENTS 6,359,617 B1    3/2002 Xiong
6,677,982 B1    1/2004 Chen et al.
(Continued)

FOREIGN PATENT DOCUMENTS

JP    2004-086784 A    3/2004
WO    1999/006943 A1   2/1999
(Continued)

OTHER PUBLICATIONS

Dmitry Federov et al., "Multi-Focus Imaging Using Local Focus Estimation and Mosaicking", International Conference on Image Processing, 2006.*
(Continued)

*Primary Examiner* — Chante Harrison
(74) *Attorney, Agent, or Firm* — Alston & Bird LLP

(57) ABSTRACT

An apparatus for generating a panoramic image(s) may include a processor and memory storing executable computer code causing the apparatus to at least perform operations including generating a panoramic image(s) based on performing registration on at least two images associated with depth map data and determining an overlap region(s) between the two images within first and second items of depth map data. The computer program code may further cause the apparatus to label the overlap region(s) within the first or second item of depth map data based on generating a virtual seam(s) connecting portions of the two images to generate a composite image. The portions correspond to image data within first and second items of depth map data. The computer program code may further cause the apparatus (Continued)

to blend the seam of the composite image to obtain the panoramic image. Corresponding methods and computer program products are also provided.

20 Claims, 6 Drawing Sheets

(51) Int. Cl.
*H04N 13/00* (2018.01)
*G09G 5/377* (2006.01)

(58) Field of Classification Search
CPC .......... H04N 5/262; H04N 5/265; H04N 7/00; H04N 13/02; H04N 2101/00
USPC ........ 345/418, 422, 619, 629; 382/284, 294; 348/36, 218.1
See application file for complete search history.

(56) References Cited

U.S. PATENT DOCUMENTS

| | | | |
|---|---|---|---|
| 7,194,112 B2 | 3/2007 | Chen et al. | |
| 7,277,118 B2* | 10/2007 | Foote | G06T 3/4038 348/218.1 |
| 9,013,543 B1* | 4/2015 | Furukawa | H04N 5/23238 348/36 |
| 9,881,376 B2* | 1/2018 | Shechtman | G06T 7/38 |
| 2002/0114536 A1 | 8/2002 | Yalin et al. | |
| 2003/0235344 A1 | 12/2003 | Kang et al. | |
| 2005/0226531 A1 | 10/2005 | Silverstein et al. | |
| 2007/0159527 A1 | 7/2007 | Kim et al. | |
| 2007/0237420 A1* | 10/2007 | Steedly | G06K 9/32 382/284 |
| 2008/0143744 A1* | 6/2008 | Agarwala | G06T 3/4038 345/629 |
| 2011/0043604 A1* | 2/2011 | Peleg | G06T 3/4038 348/36 |
| 2011/0058014 A1* | 3/2011 | Yamashita | H04N 5/23229 382/284 |
| 2011/0316963 A1* | 12/2011 | Li | H04N 7/15 348/14.1 |
| 2012/0133639 A1* | 5/2012 | Kopf | G06T 3/4038 345/419 |
| 2012/0154520 A1* | 6/2012 | Putraya | G06T 3/4038 348/36 |
| 2012/0237137 A1* | 9/2012 | Chen | G02B 21/008 382/284 |
| 2013/0169668 A1* | 7/2013 | Lynch | G01C 21/3638 345/619 |
| 2013/0208997 A1* | 8/2013 | Liu | G06T 3/20 382/284 |
| 2014/0002488 A1* | 1/2014 | Summa | G06T 3/4038 345/629 |
| 2014/0219581 A1* | 8/2014 | Astrand | G06T 3/4038 382/284 |

FOREIGN PATENT DOCUMENTS

| | | |
|---|---|---|
| WO | 2002/045001 A1 | 6/2002 |
| WO | 2004/032063 A1 | 4/2004 |
| WO | 2009/153789 A1 | 12/2009 |
| WO | 2010/028559 A1 | 3/2010 |
| WO | 2010075726 A1 | 7/2010 |
| WO | 2010/145499 A1 | 12/2010 |

OTHER PUBLICATIONS

Extended European Search Report received for corresponding European Patent Application No. 12793279.6, dated Dec. 4, 2014, 8 Pages.
Lee et al., "Panoramic Scene Generation from Multi-view Images with Close Foreground Objects", 28th Picture Coding Symposium, Dec. 8-10, 2010, pp. 486-489.
International Search Report and Written Opinion received for corresponding Patent Cooperation Treaty Application No. PCT/FI2012/050349, dated Sep. 4, 2012, 15 pages.
Szeliski et al., "Direct Methods for Visual Scene Reconstruction", Proceedings of the IEEE Workshop on Representation of Visual Scenes (In Conjuction with ICCV"95), Jun. 24, 1995, pp. 26-33.
Iiyoshi et al., "Homography-based image mosaicing by using EM algorithm for removing inconsistent overlaid region", SICE Annual Conference, Aug. 20, 2008, pp. 572-577.
Zhi et al., "Depth-based image mosaicing for both static and dynamic scenes", 19th Internationl Conference on Pattern Recognition (ICPR) Dec. 8, 2008, 4 pgs.
Office Action from European Patent Application No. 12793279.6 dated Jan. 19, 2016.

* cited by examiner

METHODS, APPARATUSES AND COMPUTER PROGRAM PRODUCTS FOR GENERATING PANORAMIC IMAGES USING DEPTH MAP DATA

RELATED APPLICATION

This application was originally filed as Patent Cooperation Treaty Application No. PCT/FI2012/050349 filed Apr. 5, 2012 which claims priority benefit to Indian Patent Application No. 1856/CHE/2011, filed May 31, 2011.

TECHNOLOGICAL FIELD

An example embodiment of the invention relates generally to image processing and more particularly, relates to a method, apparatus and computer program product for generating one or more panoramic images based in part on using depth map data.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to generating images, such as panoramic images.

The goal of panorama is to increase the field of view by stitching a sequence of images (for example, in two dimensions (2D) or three dimensions (3D)). At present, panoramic imaging may be utilized to merge various images to generate a single image in a 360° panoramic view. Currently, the merged images may be stitched together along a seam and blended to form a smooth transition. In this regard, techniques such as registration and blending may be useful in the quality of generated panorama images. Although there are some existing registration and blending tools currently available, these tools sometimes still generate mis-registrations and inefficient seams across stitched images that may be utilized for generating panoramic image(s). The mis-registrations and inefficiencies in generating seams to stitch the images may result in low quality panoramic images or panoramic images of an undesirable quality.

In view of the foregoing drawbacks, it may be beneficial to provide an efficient and reliable manner in which to generate one or more panoramic images.

BRIEF SUMMARY

A method, apparatus and computer program product may provide an efficient and reliable mechanism for generating one or more panoramic images. In this regard, an example embodiment may enable generation of one or more panoramic images based in part on using depth map in order to achieve high quality panoramic images. The depth map data may be applied to at least two images (e.g., adjacent image pairs) during registration, labeling and blending procedures.

In an example embodiment, an image capturing device may generate a panoramic image(s) based in part on stitching multiple images along with the depth map of each image of an image pair, for example. The communication device may perform registration on an image pair, for example, as well as labeling of overlap region and blending of images may be performed based in part on utilizing depth map data to produce a corresponding panoramic image(s).

During the registration procedure, the images may be divided, by the communication device, into multiple planes (e.g., depth planes) in which each plane may be or may include an image formed by pixels belonging to a range of one or more depth values. In response to dividing the images into multiple planes, a communication device of an example embodiment may calculate one or more corner correspondences for each depth plane which may be used to estimate or calculate a registration matrix.

Subsequently, a communication device of an example embodiment may perform a labeling technique on all the multiple planes (e.g., depth planes 1 and 2) or alternatively on a few (e.g., depth plane 1) of the multiple planes to identify or determine at least one seam in an overlap region(s) between the two images (e.g., two adjacent images). In this regard, a communication device of an example embodiment may utilize the seam(s) to connect portions of the two images in corresponding depth planes to obtain a finalized stitched image (also referred to herein as a composite image). The finalized stitched image may be a single image. The communication device of an example embodiment may also perform blending on a plane (e.g., depth plane) in which the seam is obtained in and/or to enable the seam to no longer be visible. In response to blending the seam(s), the communication device of an example embodiment may generate at least one corresponding panoramic image. In this regard, the generated panoramic image(s) may be based in part on at least two images and corresponding image data in multiple depth planes. By utilizing the at least two images and corresponding image data in multiple depth planes a communication device of an example embodiment may generate high quality panoramic images.

In one example embodiment, a method for generating one or more panoramic images is provided. The method may include generating at least one panoramic image based in part on performing registration on at least two images associated with respective items of depth map data. The method may further include determining at least one overlap region between the two images within at least first and second items of the depth map data. The method may further include facilitating labeling of the overlap region within at least one of the first item of depth map data or the second item of depth map data based in part on generating at least one virtual seam connecting portions of the two images to generate a composite image. The portions may correspond to respective items of image data within the first and second items of depth map data. The method may further include facilitating blending of at least the seam, corresponding to the first item or the second item, of the composite image to obtain the generated panoramic image.

In another example embodiment, an apparatus for generating one or more panoramic images is provided. The apparatus may include a processor and a memory including computer program code. The memory and the computer program code are configured to, with the processor, cause the apparatus to at least perform operations including generating at least one panoramic image based in part on performing registration on at least two images associated with respective items of depth map data. The memory and the computer program code may further cause the apparatus to determine at least one overlap region between the two images within at least first and second items of the depth map data. The memory and the computer program code may further cause the apparatus to facilitate labeling of the overlap region within at least one of the first item of depth map data or the second item of depth map data based in part on generating at least one virtual seam connecting portions of the two images to generate a composite image. The portions may correspond to respective items of image data within the first and second items of depth map data. The memory and the computer program code may further cause the apparatus to facilitate blending of at least the seam, corresponding to the first item or the second item, of the composite image to obtain the generated panoramic image.

In another example embodiment, a computer program product for generating one or more panoramic images is provided. The computer program product includes at least one computer-readable storage medium having computer executable program code instructions stored therein. The computer executable program code instructions may include program code instructions configured to generate at least one panoramic image based in part on performing registration on at least two images associated with respective items of depth map data. The program code instructions may also be configured to determine at least one overlap region between the two images within at least first and second items of the depth map data. The program code instructions may also be configured to facilitate labeling of the overlap region within at least one of the first item of depth map data or the second item of depth map data based in part on generating at least one virtual seam connecting portions of the two images to generate a composite image. The portions may correspond to respective items of image data within the first and second items of depth map data. The program code instructions may also be configured to facilitate blending of at least the seam, corresponding to the first item or the second item, of the composite image to obtain the generated panoramic image.

In another example embodiment, an apparatus for generating one or more panoramic images is provided. The apparatus may include means for generating at least one panoramic image based in part on performing registration on at least two images associated with respective items of depth map data. The apparatus may also include means for determining at least one overlap region between the two images within at least first and second items of the depth map data. The apparatus may also include means for facilitating labeling of the overlap region within at least one of the first item of depth map data or the second item of depth map data based in part on generating at least one virtual seam connecting portions of the two images to generate a composite image. The portions may correspond to respective items of image data within the first and second items of depth map data. The apparatus may also include means for facilitating blending of at least the seam, corresponding to the first item or the second item, of the composite image to obtain the generated panoramic image.

In another example embodiment, a computer program for generating one or more panoramic images is provided. The computer program may include program code instructions configured to generate at least one panoramic image based in part on performing registration on at least two images associated with respective items of depth map data. The program code instructions may also be configured to determine at least one overlap region between the two images within at least first and second items of the depth map data. The program code instructions may also be configured to facilitate labeling of the overlap region within at least one of the first item of depth map data or the second item of depth map data based in part on generating at least one virtual seam connecting portions of the two images to generate a composite image. The portions may correspond to respective items of image data within the first and second items of depth map data. The program code instructions may also be configured to facilitate blending of at least the seam, corresponding to the first item or the second item, of the composite image to obtain the generated panoramic image.

An embodiment of the invention may provide a better user experience by generating high quality panoramic images using depth map data. As such, device users may enjoy improved capabilities with respect to the generated images.

BRIEF DESCRIPTION OF THE SEVERAL VIEWS OF THE DRAWINGS

Figure 1:
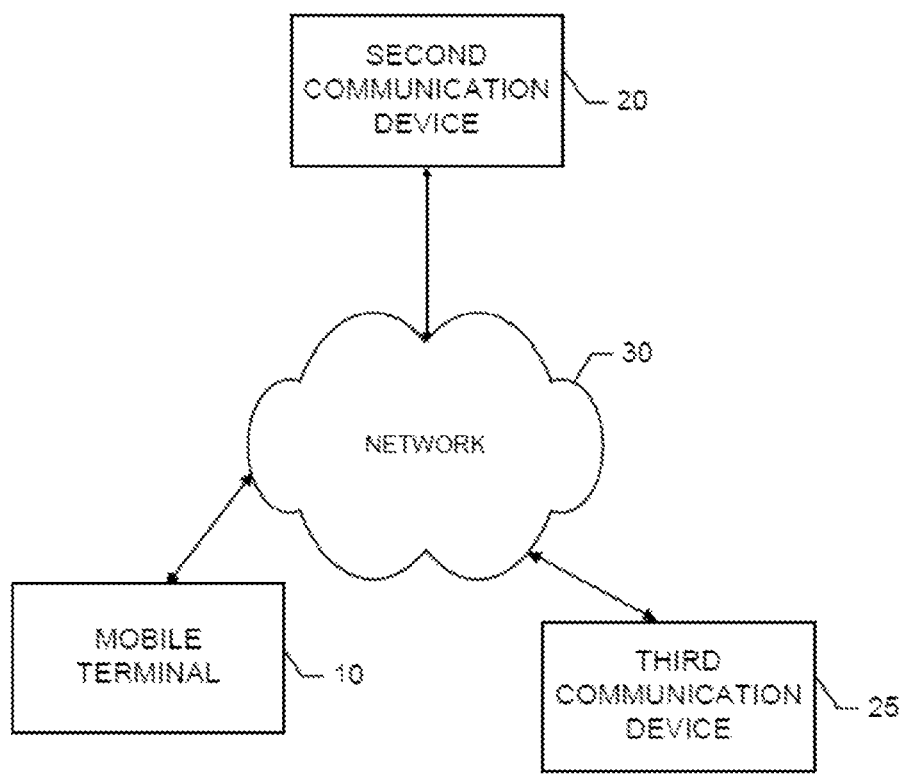
Figure 2:
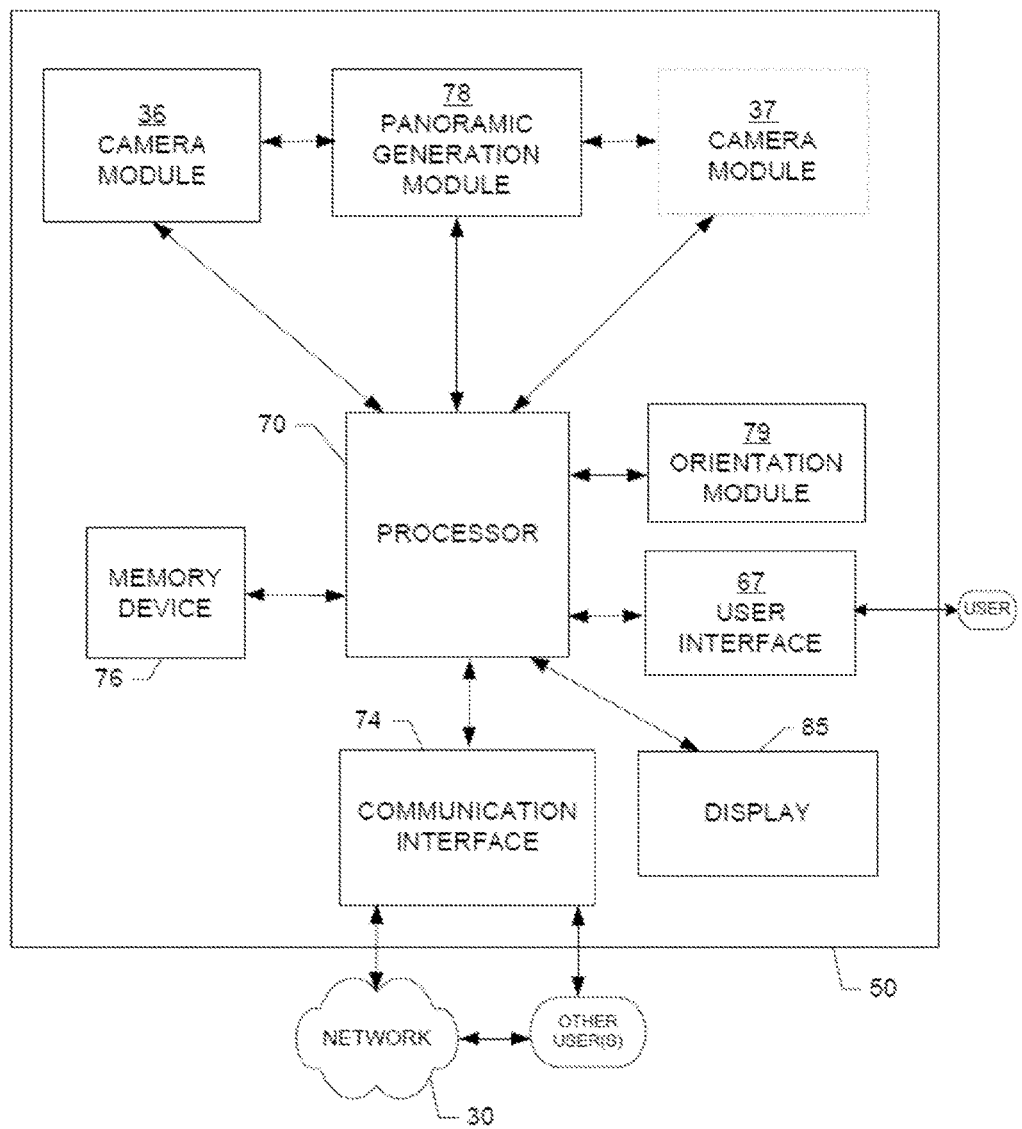
Figure 3:
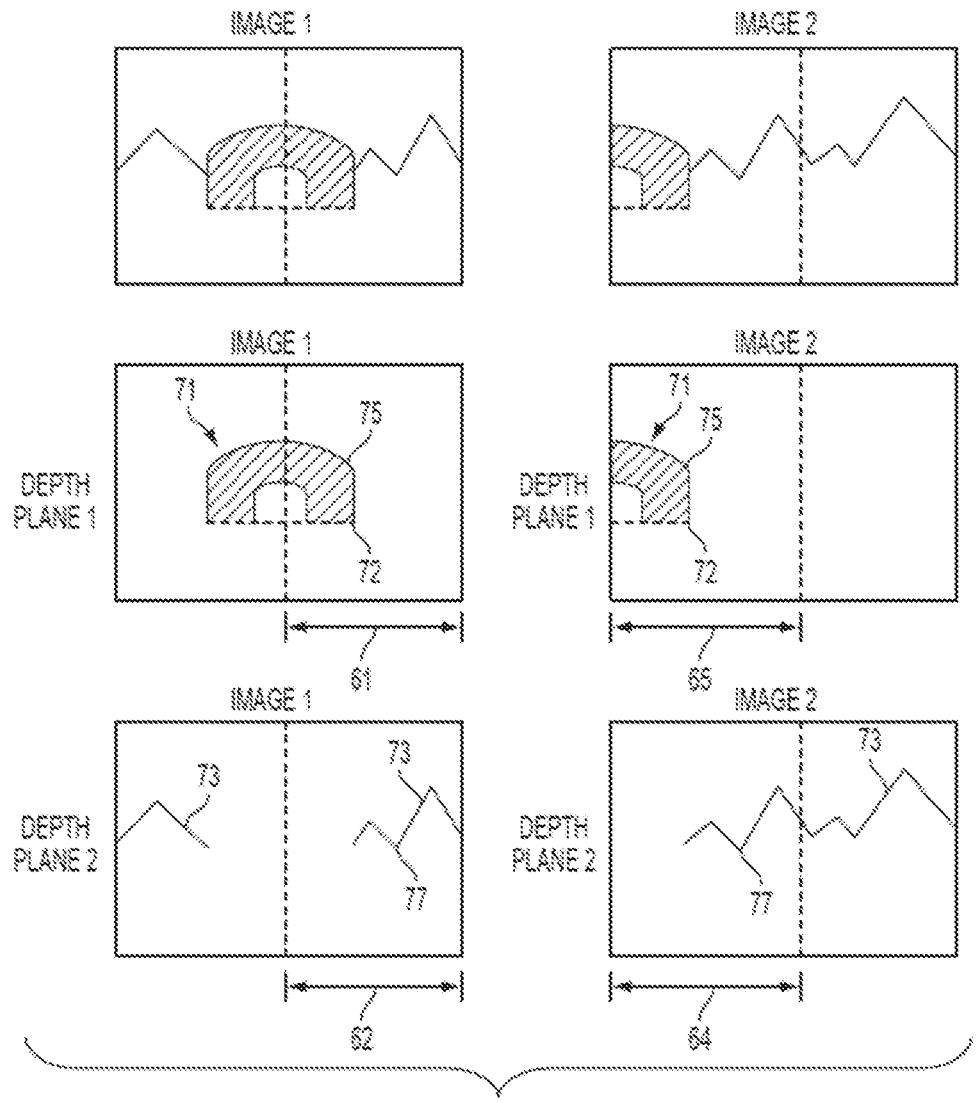
Figure 4A:
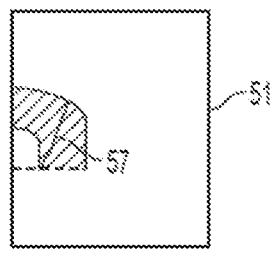
Figure 4B:
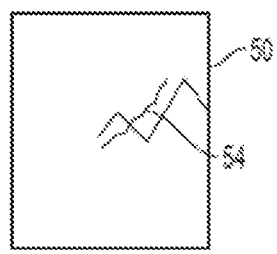
Figure 4C:
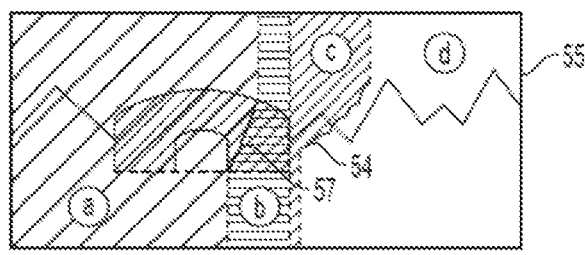
Figure 5:
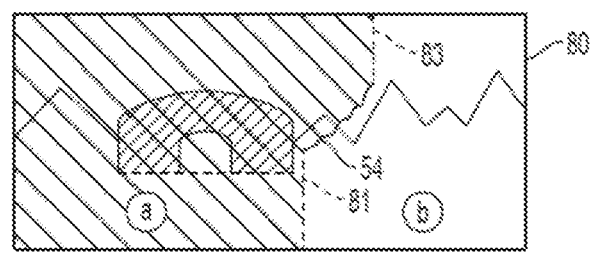
Figure 6:
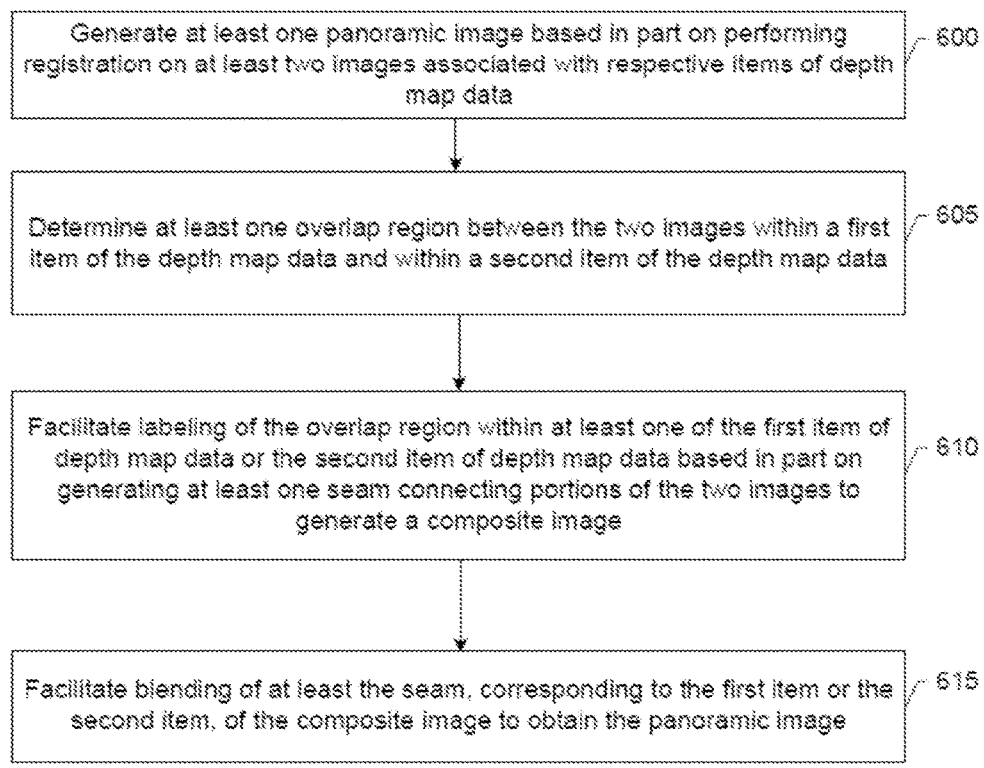

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a diagram illustrating different depth planes of image pairs for stitching the images according to an example embodiment of the invention;

FIGS. 4A, 4B and 4C are diagrams illustrating labeling and blending of panoramic generated images utilizing multiple depth planes according to an example embodiment of the invention;

FIG. 5 is a diagram illustrating labeling and blending of panoramic generated images based in part on utilizing a single depth plane, among multiple depth planes, according to an example embodiment of the invention; and FIG. 6 illustrates a flowchart for generating one or more panoramic images according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As defined herein a "viewpoint(s)" may refer to a specific location(s) at which a camera (e.g., a camera module(s)) is placed to capture an image(s). In this regard, a scene may be captured from several viewpoints.

As referred to herein a "depth map(s)" may, but need not, refer to an image, image channel, or one or more depth planes that may include information relating to a distance or a range of values of the items or objects of a captured scene(s) from a viewpoint(s) of a camera (e.g., a camera module).

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, Radio Frequency (RF), Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus for generating one or more panoramic images. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, a panoramic generation module 78, a camera module 36, an optional camera module 37, and an orientation module 79. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information (e.g., device or network configuration settings, etc.), data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., images (e.g., panoramic images), pictures, videos, etc.).

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content such as, for example, location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

The apparatus 50 includes a one or more media capturing elements, such as camera module 36 and optionally camera module 37. The camera module 36 and/or camera module 37 may include a camera, video and/or audio module, in communication with the processor 70 and the display 85. The camera module 36 and/or camera module 37 may be any means for capturing an image(s), video and/or audio for storage, display or transmission. The camera module 36 and/or the camera module 37 may, but need not, be stereoscopic (also referred to herein as stereo) cameras or any other suitable cameras. In one example embodiment, the camera modules 36, 37 may automatically capture images of the same information (e.g., a scene) from two different viewpoints. For instance, the camera module 36 may capture an image(s) of information from one viewpoint and the camera module 37 may capture an image(s) of the same information from a different viewpoint. As such, the camera module 36 and/or camera module 37 may capture two slightly different images of the same information. The panoramic generation module 78 may analyze the data (e.g., image data) of these two images to determine depth map data for each image, as described more fully below. In an alternative example embodiment, the camera module 36 may automatically capture two images of the same information from two different viewpoints.

In an example embodiment, the camera module 36 and/or the camera module 37 may utilize one or more captured images to generate one or more panoramic images, as described more fully below. The camera module 36 and/or camera module 37 may include a digital camera capable of forming a digital image file(s) from a captured image(s). As such, the camera module 36 and/or camera module 37 may include all hardware, such as a lens or other optical component(s), and software necessary for creating a digital image file from a captured image. Alternatively, the camera module 36 and/or camera module 37 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 and/or camera module 37 may further include a processing element such as a co-processor which assists the processor 70 and/or the panoramic generation module 78 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 and/or camera module 37 may provide live image data to the display 85. In this regard, the camera module 36 and/or camera module 37 may facilitate or provide a camera view to the display 85 to show live image data, still image data, video data, or any other suitable data. Moreover, in an example embodiment, the display 85 may be located on one side of the apparatus 50 and the camera module 36 and/or camera module 37 may include a lens positioned on the opposite side of the apparatus 50 with respect to the display 85 to enable the camera module 36 and/or camera module 37 to capture images on one side of the apparatus 50 and present a view of such images to the user positioned on the other side of the apparatus 50.

In an example embodiment, the apparatus 50 may further include (or be in communication with) an orientation module 79. The orientation module 79 may be any means such as a device or circuitry embodied in either hardware or a combination of hardware and software that is configured to determine the orientation of apparatus 50 and/or of the field of view (e.g., a viewpoint(s)) of the camera module 36 and/or camera module 37 of the apparatus 50. The orientation module 79 may be in communication with the panoramic generation module 78.

Orientation module 79 may be configured to determine the orientation of apparatus 50 relative to a reference. In some cases, the reference may be a particular direction, such as North or another cardinal direction. However, other references could also be employed. As such, in one embodiment, the orientation module 79 may include a compass or other orientation sensor configured to determine the heading of the apparatus 50 or direction that the lens of the camera module 36 and/or camera module 37 is pointing. The direction or heading may be determined in terms of degrees (e.g., 0 to 360 degrees) offset from the reference. In some cases, the reference may be fixed (e.g., a fixed directional reference), while in other cases, the reference may be a reference of opportunity such as a prominent feature in an image captured by the camera module 36 and/or camera module 37 or simply an initial orientation. In one embodiment, the orientation module 79 may include an electronic compass, a horizon sensor, gravity sensor, accelerometer, gyroscope, magnetometer and/or the like or any other sensor that may be useful in determining orientation information.

In an example embodiment, the processor 70 may be embodied as, include or otherwise control the panoramic generation module 78. The panoramic generation module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the panoramic generation module 78, as described below. Thus, in an example in which software is employed, a device or circuitry (e.g., the processor 70 in one example) executing the software forms the structure associated with such means.

The panoramic generation module 78 may analyze images captured by the camera module 36 and/or camera module 37 to generate one or more corresponding panoramic images based in part on utilizing depth map data. In one example embodiment, the panoramic generation module 78 may determine depth map data of a captured image(s) based on a distance from a point where the image(s) was captured. For purposes of illustration and not of limitation, in an instance in which the camera module 36 may capture an image of a building with mountains in the background at a certain distance, the panoramic generation module 78 may determine that the captured image has depth map data in proportion to the distance from the camera module 36 to the items of information (e.g., digital image data of the building and mountains) being captured by the camera module 36. As another example, in an instance in which a user of the apparatus 50 moves closer to the mountains and utilizes the camera module 36 to capture another image of the building and the mountains, the panoramic generation module 78 may determine that the captured image has different depth map data based in part on the proportion of the closer distance of the camera module 36 to the items of information (e.g., digital image data of the building and mountains) being captured by the camera module 36. In this regard, depth map data may, but need not, relate in part to different distances from objects being captured by a camera module (e.g., camera module 36, camera module 37).

Additionally or alternatively, the panoramic generation module 78 may utilize the two slightly different images of the same information (e.g., a scene) that may be automatically captured by the camera module 36 and/or camera module 37, respectively to compute depth map data based in part on the different viewpoints in which the two images are captured. For example, in an instance in which the camera module 36 captures an image of a scene using a viewpoint, and camera module 37 captures an image of the same scene from a different viewpoint, the panoramic generation module 78 may determine depth map data from the 2 captured images.

The panoramic generation module 78 may generate one or more panoramic images based in part on analyzing one or more stitched images and depth map data of corresponding captured images, as described more fully below. Additionally, the panoramic generation module 78 may generate the panoramic images based in part on performing: (1) registration of image pairs facilitated by depth map data; (2) warping and color correction of the image pairs; (3) facilitating labeling of the overlap region(s) between the image pairs using depth map data; and (4) facilitating blending of images using the depth map data to generate at least one image from image pairs (e.g., two images).

As referred to herein, registration may be a technique performed by the panoramic generation module 78 in which the perspectivity of adjacent images (e.g., image pairs) may be calculated and embedded in a matrix (also referred to herein as registration matrix), by the panoramic generation module 78. Based on this matrix generated by the panoramic generation module 78, the two images may be warped to align the images in a manifold. The panoramic generation module 78 may minimize errors that may be exhibited by conventional techniques since a small error in calculating the registration matrix may result in poor output image quality as the two images may be fit at incorrect co-ordinates. In an example embodiment, in order to calculate the registration matrix, the panoramic generation module 78 may determine a correspondence between corner points in the two adjacent images in one or more overlap regions. The panoramic generation module 78 may utilize this correspondence(s) to determine the elements of the registration matrix to obtain the final registration matrix.

In performing registration, the panoramic generation module 78, may utilize depth map data to provide depth information for each pixel captured in one or more images (e.g., two adjacent images) by the camera module 36 and/or camera module 37. In this regard, the panoramic generation module 78 may perform registration based in part on utilizing the depth map of the two adjacent images (e.g., image pairs) captured by camera module 36 (or alternatively camera module 37), in which both the images may be divided into multiple planes (e.g., depth planes), and in which each plane may be, or may include, an image formed by pixels belonging to a range of depth values, as shown in FIG. 3. In FIG. 3, image 1 and image 2 may be adjacent captured images with around 50% overlap between the images. As shown in FIG. 3, there are two depth planes (e.g., depth plane 1, depth plane 2) for the images which are shown separately for both the images. In the example embodiment of FIG. 3, the panoramic generation module 78 may determine, for example, that depth plane 1 is closer to the camera (e.g., camera module 36) as compared to the depth plane 2. In the example embodiment of FIG. 3, image 1 and image 2 may, but need not be, adjacent image pairs captured by the camera module 36 (or alternatively camera module 37). For example, in response to receipt of an indication to capture an image, the camera module 36 may automatically capture image A according to one viewpoint and camera module 37 may automatically capture image B, substantially simultaneously with the capturing of image A, according to a different viewpoint. In this regard, the panoramic generation module 78 may determine depth map data (e.g., depth plane 1 and depth plane 2) for either image A or image B. Additionally, in the example embodiment of FIG. 3, the panoramic generation module 78 may determine that the images (e.g., images 1 and 2) associated with depth plane 1 corresponds to image data of a building 71. On the other hand, the panoramic generation module 78 may determine that the images (e.g., images 1 and 2) associated with depth plane 2 corresponds to image data of one or more mountains 73.

In order to create a panorama of first and second images (e.g., images 1 and 2), the panoramic generation module 78 may identify an overlap(s) between a first image (e.g., Image 1) and a second image (e.g., Image 2) of an image pair. In this regard, in performing registration, the panoramic generation module 78 may utilize the data associated with the identified overlap to determine or calculate one or more corner correspondences of the images for each of the depth planes. For purposes of illustration and not of limitation, with respect to depth plane 1, the panoramic generation module 78 may determine a corresponding overlap region (e.g., overlap region 61 and overlap region 65) of the building 71 in images 1 and 2 for depth plane 1 and may determine a correspondence between one or more corner points in images 1 and 2 (e.g., two adjacent images). As referred to herein, a "corner point(s)" or a "corner correspondence(s)" may refer to one or more corners in an overlapping region of two adjacent images for a corresponding depth plane. As such, the panoramic generation module 78 may determine one or more corners in an overlapping region of image 1 for depth plane 1 that conform or correspond to corners in image 2 for depth plane 1. In this regard, for example, the panoramic generation module 78 may determine that co-ordinate 75 of the building 71 corresponds to a corner point in image 1 and image 2 for depth plane 1. Additionally or alternatively, for example, the panoramic generation module 78 may determine that the bottom 72 of the building 71 corresponds to a corner point in image 1 and image 2 for depth plane 1. It should be pointed out that the panoramic generation module 78 may determine any other suitable corner points for images 1 and 2 for depth plane 1 without departing from the spirit and scope of the invention.

In a similar manner, the panoramic generation module 78 may determine that a portion 77 of the mountains 73 is associated with a corner point(s) in an overlap region (e.g., overlap region 62) in image 1 that conforms or corresponds to corner point(s) in the overlap region (e.g., overlap region 64) in image 2 for depth plane 2. It should be pointed out that the panoramic generation module 78 may determine any other suitable corner points for images 1 and 2 for depth plane 2 without departing from the spirit and scope of the invention. In response to determining the corner correspondences for images 1 and 2 in depth planes 1 and 2, the panoramic generation module 78 may utilize the determined corner correspondences to estimate or calculate the registration matrix. By calculating the corner points for adjacent image pairs for each depth plane separately the panoramic generation module 78 may determine corner correspondences more reliably than some traditional/conventional mechanisms of calculating correspondences. For instance, some traditional/conventional mechanisms that may not utilize depth map data for calculating corner correspondences, for example, may determine that a corner point of the building 71 relates to a corresponding corner point of mountains 73. Such an error may result in generation of a reduced quality panoramic image.

In an alternative example embodiment, the panoramic generation module 78 may determine one or more corner correspondences of adjacent image pairs (e.g., image 1 and image 2) without using any depth map information (e.g., data of depth plane 1 and/or data of depth plane 2). In this example embodiment, the corner correspondences determined by the panoramic generation module 78 may be cross-verified to determine whether the corner correspondences are in the same depth plane. In this regard, in an instance in which the panoramic generation module 78 may determine that calculated corner correspondences (e.g., a correspondence point relating to arch 75 of the building 71 conforming to a correspondence point of a portion 77 of the mountains 73) are not at the same depth plane (e.g., depth plane 1) and as such the panoramic generation module 78 may determine that these corner points may be eliminated from further processing by the panoramic generation module 78. On the other hand, in an instance in which the panoramic generation module 78 may determine that calculated corner correspondences (e.g., correspondence points related to arch 75 of images 1 and 2) are at the same depth plane (e.g., depth plane 1), the panoramic generation module 78 may verify that the calculated correspondence points are valid and may use the calculated correspondence points in determining the registration matrix.

In an example embodiment in calculating the registration matrix the panoramic generation module 78 may identify or determine warping of the images associated with the distortion of image 1 with respect to image 2 of the adjacent image pair. The identified warping of images 1 and 2 may be based on the distortion associated with images 1 and 2. The distortion may be associated with images 1 and 2 being captured. In an example embodiment, the identified/determined warping may be utilized by the panoramic generation module 78 to correct the image distortion associated with images 1 and 2.

In generating one or more panoramic images, the panoramic generation module 78 may also perform a labeling technique. In order to perform labeling, the panoramic generation module 78 may determine or identify a seam(s) in an overlap region between two adjacent images (e.g., image 1 and image 2) which have minimal distortion and across which the two images may be blended by the panoramic generation module 78.

In an example embodiment, the panoramic generation module 78 may utilize depth map data, in part, to perform labeling and blending techniques. The depth map data may provide the depth associated with each pixel of the two adjacent images in a scene(s). The panoramic generation module 78 may perform the labeling technique in part by using depth map data in which two adjacent images (e.g., image pairs) (e.g., images 1 and 2), may be divided into multiple planes (e.g., depth planes), where each plane (e.g., depth plane) may be or may include an image formed by pixels which belong to a range of depth values, as shown in FIG. 3. As described above, image 1 and image 2 may be adjacent images with around 50% overlap between images 1 and 2. The panoramic generation module 78 may also determine warping of images 1 and 2 and may color correct images 1 and 2.

The panoramic generation module 78 may perform labeling on each of the planes (e.g., depth planes 1 and 2) in the overlap region(s) between the two adjacent images, (e.g., images 1 and 2), as shown in FIGS. 4A and 4B and as described more fully below. In an alternative example embodiment, the panoramic generation module 78 may perform labeling on one plane or a lower number of planes than the multiple planes that may be available, as shown in FIG. 5 and as described more fully below.

Referring now to FIGS. 4A, 4B and 4C a diagram illustrating labeling and blending of images associated with depth planes for generating one or more panoramic images is provided. In the example embodiment of FIGS. 4A, 4B and 4C, the panoramic generation module 78 may stitch (or generate a seam(s)) the two adjacent images (e.g., images 1 and 2) in an instance in which the panoramic generation module 78 may perform labeling and blending on both depth planes 1 and 2 in order to generate a corresponding panoramic image(s). In this regard, the panoramic generation module 78 may determine where a portion of image 1 in a corresponding overlap region ends and where a portion of image 2 begins in the corresponding overlap region for depth planes 1 and 2.

In order to generate the stitch, the panoramic generation module 78 may input (e.g., superimpose) a geometrical object (e.g., a line) denoting a seam 57 at a point in which the panoramic generation module 78 determines data of image 1 ends and data of image 2 begins in the corresponding overlap region 51 between image 1 and image 2 for depth plane 1. As such, the panoramic generation module 78 may determine that all the portion of the data to the left of the seam 57 corresponds to image 1 and that all the portion of the data to the right of the seam 57 corresponds to image 2. As such, the panoramic generation module 78 may determine that by stitching image 1 and image 2 along the geometrical object denoting the generated optimal seam 57 (e.g., a virtual seam), the panoramic generation module 78 may generate a single image (e.g., a composite image of images 1 and 2) from image 1 and image 2 corresponding to depth plane 1.

In order to generate a stitch for images 1 and 2 in depth plane 2, the panoramic generation module 78 may input a geometrical object (e.g., a line) denoting a seam 54 at a point in which the panoramic generation module 78 may determine data of image 1 ends and data of image 2 begins in the corresponding overlap region 50 between image 1 and image 2 for depth plane 2. As such, the panoramic generation module 78 may determine that all the portion of the data to the left of the seam 54 corresponds to image 1 and that all the portion of the data to the right of the seam 54 corresponds to image 2 for depth plane 2. In this regard, the panoramic generation module 78 may determine that by stitching image 1 and image 2 along the geometrical object denoting the generated optimal seam 54 (e.g., a virtual seam), the panoramic generation module 78 may generate a single image (e.g., a composite image of images 1 and 2) from image 1 and image 2 corresponding to depth plane 2. It should be pointed out that the geometrical object(s) utilized by the panoramic generation module 78 to generate an optimal seam(s) may be a line (e.g., vertical line) or any other suitable geometrical object (e.g., a circular arc or any free shape curve). In this regard, the geometrical object(s), generated by the panoramic generation module 78 may be any geometrical object(s) that may span an upper portion of an image(s) (e.g., images 1 and 2 for depth plane 1) in an overlap region (e.g., overlap region 51) and which may span a bottom portion of the corresponding image(s) (e.g., images 1 and 2 for depth plane 1).

The panoramic generation module 78 may utilize the data associated with the seams 57 and 54 to generate a finalized stitched image, as shown in FIG. 4C. In this regard, the final stitched image 55 generated by the panoramic generation module 78 may be based in part on data of depth plane 1 and depth plane 2. In the example embodiment of FIG. 4C, the panoramic generation module 78 may determine that all portions of a region (e.g., region a) of image data to the left of seam 57 corresponds to image 1 within depth plane 1. Additionally, the panoramic generation module 78 may determine that all portions of a region (e.g., region b) of image data to the right of the seam 57 correspond to image 2 within depth plane 1. Moreover, the panoramic generation module 78 may determine that all portions of a region (e.g., region c) of image data to the left of seam 54 correspond to image 1 within depth plane 2. The panoramic generation module 78 may also determine that all portions of a region (e.g., region d) of image data to the right of the seam 54 correspond to image 2 within depth plane 2. In this regard, the panoramic generation module 78 may utilize the seams 54, 57 to generate the finalized stitched single 55 image for depth planes 1 and 2, as shown in FIG. 4C.

In response to generating the finalized stitched image 55, the panoramic generation module 78 may blend the seam 57 on depth plane 1 and the seam 54 on depth plane 2 so that the seams 57 and 54 may no longer be visible. The panoramic generation module 78 may blend the seams by propagating across the seams 57 and 54. In response to completing the blend of the seams 57, 54, the panoramic generation module 78 may generate (or output) the corresponding generated panoramic image(s) corresponding to the two image pairs (e.g., images 1 and 2) associated with depth map data relating to depth planes 1 and 2. In this regard, the panoramic module 78 may generate a high quality panoramic image(s).

In an example embodiment, the panoramic generation module 78 may enable provision of display, via display 85, of the generated panoramic image(s), printing of generated panoramic image(s), sharing of the generated panoramic image(s) with other apparatuses 50 or performing any other suitable task(s) or action(s) associated with the generated panoramic image(s).

Referring now to FIG. 5, a diagram illustrating labeling and blending performed on one of two depth planes is provided. In the example embodiment of FIG. 5, the panoramic generation module 78 may select a depth plane having a higher quality in order to stitch at least two adjacent images (e.g., image 1 and image 2) via a seam. In the example embodiment of FIG. 5, the panoramic module 78 may determine that depth plane 2 has a higher/better quality than depth plane 1. For instance, in this example embodiment the panoramic generation module 78 may determine that image data of the mountains 73 in depth plane 2 are more focused than the image data of the building 71 in depth plane 1 and as such the panoramic generation module 78 may determine that depth plane 2 has a higher/better quality than depth plane 1.

By determining that the depth 2 has the higher quality, the panoramic generation module 78 may utilize the seam 54 of depth plane 2 (see e.g., FIG. 4B) to generate a final stitched image corresponding to adjacent images 1 and 2. As such, the panoramic generation module 78 may determine that the region (e.g., region a) to the left of the seam 54 corresponds to image data of image 1 with respect to depth plane 1, as shown in FIG. 5. In addition, the panoramic generation module 78 may determine that the region (e.g., region b) to the right of the seam 54 corresponds to image 2 in depth plane 2. In this regard, the panoramic generation module 78 may utilize the seam 54 to stitch images 1 and 2 together to generate a final stitched image 80. In response to generating the final stitched image 80, the panoramic generation module 78 may perform blending on the seam 54 so that the seam 54 may no longer be visible. Upon completion of the blending, the panoramic generation module 78 may generate a panoramic image(s) corresponding to images 1 and 2 associated with depth planes 1 and 2.

It should be pointed out that in the final stitched image 80 of the example embodiment of FIG. 5, the panoramic generation module 78 may determine that image data 81 corresponds to the ground beneath the building 71 and that image data 83 corresponds to the sky. Additionally, in an alternative example embodiment, the panoramic generation module 78 may determine that the depth plane 1 has a higher quality than depth plane 2 and may utilize the seam 57 (see e.g. FIG. 4A) to generate a final stitched image. In this alternative example embodiment for instance, the panoramic generation module 78 may determine that the image data of the building 71 may be more focused than the image data of the mountains 73 and in this regard the panoramic generation module 78 may utilize the seam 57 of depth plane 1 to generate the final stitched image of images 1 and 2.

It should be pointed out that although two depth planes were utilized for performing registration, labeling and blending, in an example embodiment, any suitable number of depth planes (e.g., three, etc.) may be utilized for performing registration, labeling, and blending without departing from the spirit and scope of the invention.

Referring now to FIG. 6, a flowchart for enabling generation of one or more panoramic images based in part on depth map data according to an example embodiment is provided. At operation 600, an apparatus (e.g., panoramic generation module 78) may generate at least one panoramic image based in part on performing registration on at least two images (e.g., image 1 and image 2) associated with respective items of depth map data (e.g., depth plane 1 and depth plane 2). At operation 605, an apparatus (e.g., panoramic generation module 78) may determine at least one overlap region (e.g., overlap region 51, overlap region 50) between the two images within a first item (e.g., depth plane 1) of the depth map data and within a second item (e.g., depth plane 2) of the depth map data.

At operation 610, an apparatus (e.g., panoramic generation module 78) may facilitate labeling of the overlap region (e.g., overlap region 51, overlap region 50) within at least one of the first item of depth map data or the second item of depth map data based in part on generating at least one virtual seam (e.g., seam 57 or seam 54) connecting portions of the two images (e.g., images 1 and 2) to generate a composite image (e.g., image 55, image 80). The portions (e.g., regions a, b, c, d of FIG. 4C, regions a, b of FIG. 5) correspond to respective items of image data within the first and second items of depth map data. At operation 615, an apparatus (e.g., panoramic generation module 78) may facilitate blending of at least the seam of the composite image to obtain the panoramic image. The seam (e.g., seam 57, seam 54) may correspond to the first item (e.g., depth plane 1) of depth map data or the second item (e.g., depth plane 2) of depth map data. For instance, the seam(s) may be obtained within the first item (e.g., depth plane 1) and/or the second item (e.g., depth plane 2) of depth map data.

It should be pointed out that FIG. 6 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., processor 70, panoramic generation module 78). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 6 above may comprise a processor (e.g., the processor 70, the panoramic generation module 78) configured to perform some or each of the operations (600-615) described above. The processor may, for example, be configured to perform the operations (600-615) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (600-615) may comprise, for example, the processor 70 (e.g., as means for performing any of the operations described above), the panoramic generation module 78 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A method comprising:
    generating at least one panoramic image based in part on performing registration on at least two images by dividing the at least two images into a first depth plane, a second depth plane, and a third depth plane using depth map data which provides depth associated with each pixel of the at least two images, wherein each depth plane of the first depth plane, the second depth plane, and the third depth plane includes an image formed by pixels which belong to a range of depth values;
    determining at least one overlap region between the at least two images within at least the first depth plane, the second depth plane, and the third depth plane;
    generating at least one virtual seam connecting portions of the two images in the overlap region to generate a composite image, each virtual seam being associated with each depth plane of the first depth plane, the second depth plane, and the third depth plane; and
    facilitating blending of the at least one virtual seam of the composite image to obtain the generated panoramic image.

2. The method of claim 1, further comprising:
    capturing the two images with different viewpoints or image data obtained from different distances, wherein image information of a first image of the two images corresponds to image content of a second image of the two images.

3. The method of claim 1, wherein registration comprises determining one or more corner correspondences associated with the first, second, and third depth planes, the corner correspondences relate to one or more corner points in a first image of the two images in the overlap region that corresponds to one or more corner points in a second image of the two images in the overlap region.

4. The method of claim 3, further comprising:
utilizing the corner correspondences to calculate a registration matrix.

5. The method of claim 1, wherein registration comprises determining one or more corner correspondences relating to one or more corner points in a first image of the two images in the overlap region that corresponds to one or more corner points in a second image of the two images in the overlap region, wherein the method further comprises:
comparing respective corner correspondences to one or more corner points in the first image and the second image to determine whether at least one of the corner correspondences correspond to corner points associated with a same depth plane.

6. The method of claim 5, further comprising:
eliminating a first subset of the corner points that are determined not to correspond to the respective corner correspondences from further processing; and
utilizing a second subset of the corner points that are determined to correspond to the respective corner correspondences, in part, to calculate a registration matrix.

7. The method of claim 6, further comprising:
verifying that the second subset of the corner points are valid based on the second subset of corner points being determined to correspond to the respective corner correspondences.

8. The method of claim 1, wherein the at least one virtual seam is associated with at least the first depth plane, the second depth plane, or the third depth plane and selection of at least the first depth plane, the second depth plane, or the third depth plane is based upon the quality of image data in each depth plane.

9. The method of claim 1, wherein the overlap region comprises a portion of a first image of the two images being superimposed over a portion of a second image of the two images.

10. An apparatus comprising:
at least one processor; and
at least one memory including computer program code configured to, with the at least one processor, cause the apparatus to perform at least the following:
generate at least one panoramic image based in part on performing registration on at least two images by dividing the at least two images into a first depth plane, a second depth plane, and a third depth plane using depth map data which provides depth associated with each pixel of the at least two images, wherein each depth plane of the first depth plane, the second depth plane, and the third depth plane includes an image formed by pixels which belong to a range of depth values;
determine at least one overlap region between the at least two images within at least the first depth plane, the second depth plane, and the third depth plane;
generate at least one virtual seam connecting portions of the two images in the overlap region to generate a composite image, each virtual seam being associated with each depth plane of the first depth plane, the second depth plane, and the third depth plane; and
facilitate blending of the at least one virtual seam of the composite image to obtain the generated panoramic image.

11. The apparatus of claim 10, wherein the apparatus is further caused to perform:
capture the two images with different viewpoints or image data obtained from different distances, wherein image information of a first image of the at least two images corresponds to image content of a second image of the at least two images.

12. The apparatus of claim 10, wherein the apparatus is further caused to:
perform the registration by determining one or more corner correspondences associated with the first, second, and third depth planes, the corner correspondences relate to one or more corner points in a first image of the two images in the overlap region that corresponds to one or more corner points in a second image of the two images in the overlap region.

13. The apparatus of claim 12, wherein the apparatus is further caused to perform:
utilize the corner correspondences to calculate a registration matrix.

14. The apparatus of claim 10, wherein the apparatus is further caused to:
perform the registration by determining one or more corner correspondences relating to one or more corner points in a first image of the two images in the overlap region that corresponds to one or more corner points in a second image of the two images in the overlap region; and
compare respective corner correspondences to one or more corner points in the first image and the second image to determine whether at least one of the corner correspondences corresponds to corner points associated with a same depth plane.

15. The apparatus of claim 14, wherein the apparatus is further caused to perform:
eliminate a first subset of the corner points that are determined not to correspond to the respective corner correspondences from further processing; and
utilize a second subset of the corner points that are determined to correspond to the respective corner correspondences, in part, to calculate a registration matrix.

16. The apparatus of claim 15, wherein the apparatus is further caused to perform:
verify that the second subset of the corner points are valid based on the second subset of corner points being determined to correspond to the respective corner correspondences.

17. A computer program product comprising at least one non-transitory computer-readable storage medium having computer executable program code instructions stored therein, the computer executable program code instructions configured to:
generate at least one panoramic image based in part on performing registration on at least two images by dividing the at least two images into a first depth plane, a second depth plane, and a third depth plane using depth map data which provides depth associated with each pixel of the at least two images, wherein each depth plane of the first depth plane, the second depth plane, and the third depth plane includes an image formed by pixels which belong to a range of depth values;

determine at least one overlap region between the at least two images within at least the first depth plane, the second depth plane, and the third depth plane;

generate at least one virtual seam connecting portions of the two images in the overlap region to generate a composite image, each virtual seam being associated with each depth plane of the first depth plane, the second depth plane, and the third depth plane; and facilitate blending of the at least one virtual seam of the composite image to obtain the generated panoramic image.

18. The computer program product of claim 17, wherein registration comprises determining one or more corner correspondences relating to one or more corner points in a first image of the two images in the overlap region that corresponds to one or more corner points in a second image of the two images in the overlap region, wherein the computer program product further comprising program code instructions configured to:

compare respective corner correspondences to one or more corner points in the first image and the second image to determine whether at least one of the corner correspondences corresponds to corner points associated with a same depth plane.

19. The apparatus of claim 10, wherein the at least one virtual seam is associated with at least the first depth plane, the second depth plane, or the third depth plane and selection of at least the first depth plane, the second depth plane, or the third depth plane is based upon the quality of image data in each depth plane.

20. The computer program product of claim 17, wherein the at least one virtual seam is associated with at least the first depth plane, the second depth plane, or the third depth plane and selection of at least the first depth plane, the second depth plane, or the third depth plane is based upon the quality of image data in each depth plane.

* * * * *